Oct. 4, 1966   H. KÜPPENBENDER ETAL   3,276,837
MOTION PICTURE CAMERA
Filed Aug. 19, 1964   6 Sheets-Sheet 1
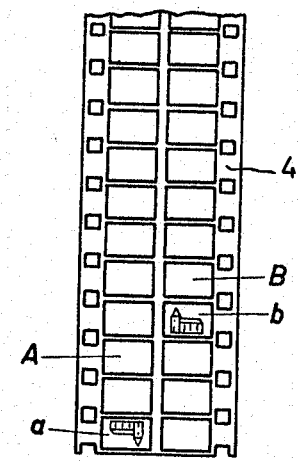
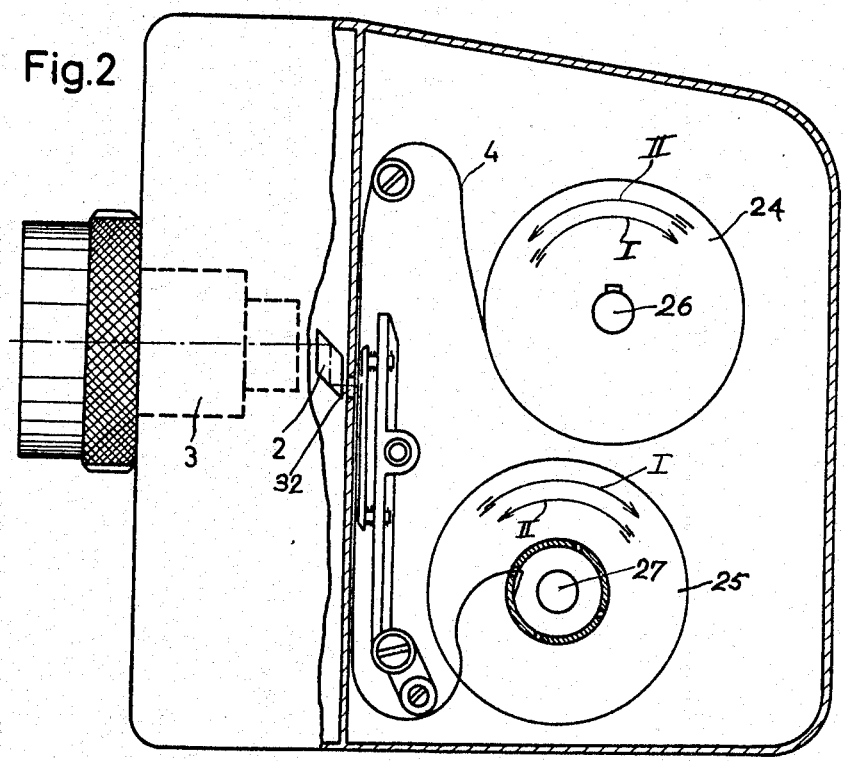
INVENTORS.
Heinz Küppenbender
Günther Lange
Otto Erbe
by Singer Stern & Carlberg
Attorneys

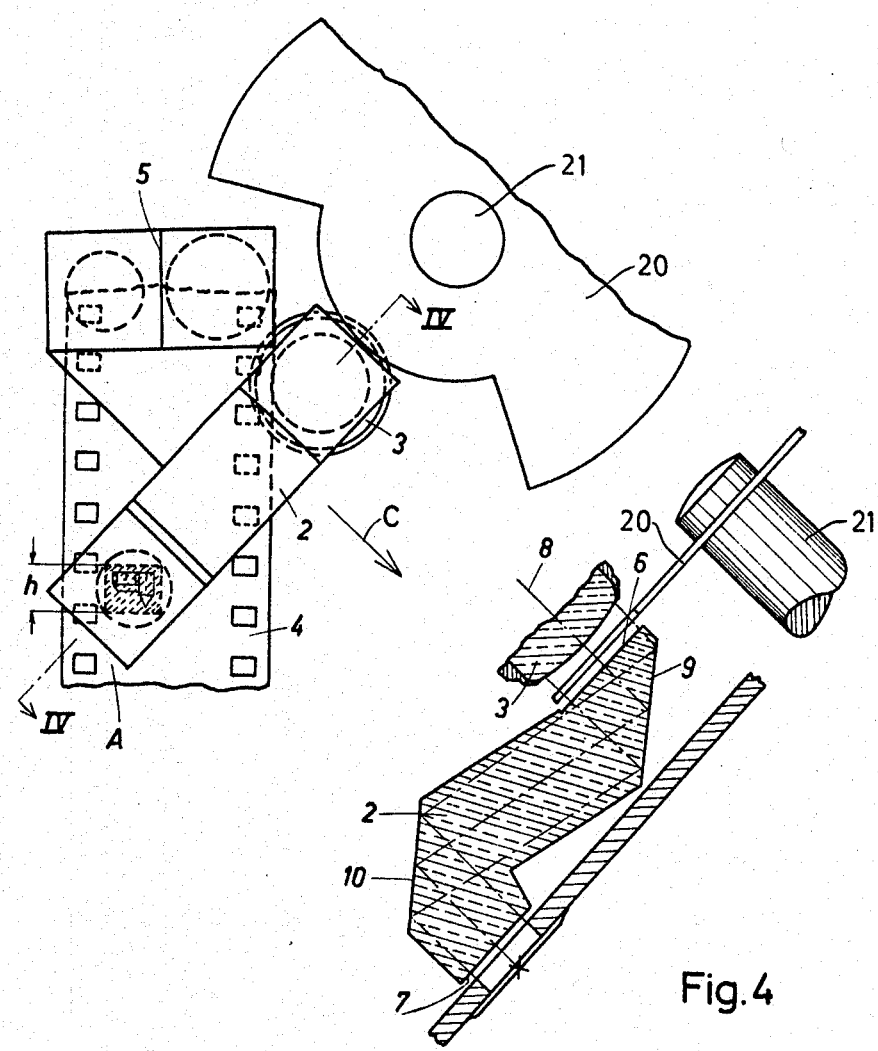

Oct. 4, 1966 H. KÜPPENBENDER ETAL 3,276,837
MOTION PICTURE CAMERA
Filed Aug. 19, 1964 6 Sheets-Sheet 3

INVENTORS:
Heinz Küppenbender
Günther Lange
Otto Erbe
by Singer, Stern &
Carlberg, Attorneys.

Oct. 4, 1966  H. KÜPPENBENDER ETAL  3,276,837
MOTION PICTURE CAMERA

Filed Aug. 19, 1964  6 Sheets-Sheet 4

INVENTORS:
Hying Küppenbender
Günther Lange
Otto Erbe
by Singer, Stern &
Carlberg, Attorneys Oct. 4, 1966   H. KÜPPENBENDER ETAL   3,276,837
MOTION PICTURE CAMERA
Filed Aug. 19, 1964   6 Sheets-Sheet 5

3,276,837
MOTION PICTURE CAMERA
Heinz Küppenbender and Günther Lange, Heidenheim (Brenz), and Otto Erbe, Aalen, Wurttemberg, Germany, assignors to Carl Zeiss-Stiftung, doing business as Carl Zeiss, Heidenheim (Brenz), Germany, a corporation of Germany
Filed Aug. 19, 1964, Ser. No. 390,630
Claims priority, application Germany, Aug. 22, 1963, Z 10,308
5 Claims. (Cl. 352—83)

The present invention relates to motion picture cameras for two sidedly perforated films of double picture width and concerns in particular 8 mm. narrow film cameras. It is known to use in motion picture cameras equipped for making 8 mm. exposures a film of 16 mm. width and to expose this film during two separate consecutive shooting periods in such a manner that two rows of pictures A and B are produced thereon. Each half of the film is in its total length continuously exposed to form thereon a series of pictures so that the two half strips of the film, after separating the film along the center line between the two rows of pictures, may be joined together to form one continuous film. Between the two shooting periods the film spools as a rule are taken out of the camera, are exchanged and are reinserted in the camera.

It is the object of the invention to expose the two light sensitive strips A and B of the film one after the other without having to exchange the film spools between the shooting periods, in that optical means are provided which permit an exposure of the picture strip B during rewinding of the spool after the exposure of the picture strip A has been completed in the first shooting period.

The invention applies to motion picture cameras in which the plane of the picture on the film in the usual way is positioned perpendicular to the optical axis of the camera objective. The invention proposes for such cameras to so arrange a prism combination in the light beam path between the camera objective and the picture plane that this prism combination may be operative in two different positions so that in one position the objective light rays are directed onto the light sensitive strip A, and in the other position the light rays passing through the camera objective are directed onto the strip B. The prisms of this prism arrangement are such that the pictures on the strip B are turned about an angle of 180° with respect to the pictures on the strip A and relative to an axis of rotation parallel to the optical axis of the camera objective.

Such prism arrangements may be of different constructions. The essential requirement is that in the two positions the pictures are turned about by an angle of 180° with respect to each other.

If the film guide is to remain in the usual way, i.e. perpendicular in a normally held camera, the prisms have to be so arranged that the pictures of the strip A have the same orientation as a picture taken without the prisms. In such a case the set of prisms causes therefore in the first position A merely a parallel displacement of the picture with respect to the position in which it would be had it been exposed without the use of the prisms, whereas the set of prisms causes in the other position B not only a displacement but simultaneously also a turning of the picture about an angle of 180°.

The invention will now be described in more detail with reference to the accompanying drawings, in which FIG. 1 illustrates a piece of a film strip with two adjacent rows of pictures A and B and viewed from the front of the motion picture camera;

FIG. 2 illustrates a side elevation view of a motion picture camera of the invention with a portion of the casing in section so as to show the film spools and the film guiding means;

FIG. 3 illustrates diagrammatically a prism arrangement of the invention when viewed from the front of the camera;

FIG. 4 is a sectional view substantially along the line IV—IV of FIG. 3;

Referring to FIG. 1, the illustrated piece of film 4 shows in the row A a picture "a" of a building being oriented as is usual in a motion picture camera, i.e. upside down. In this case a modified rhombic prism 2 (see FIG. 3) is interposed in the beam of light between the camera objective 3 and the film 4. This prism 2 effects merely a displacement of the picture and directs the light ray to the side of the film where the picture row A appears in customary position.

Figure 5:
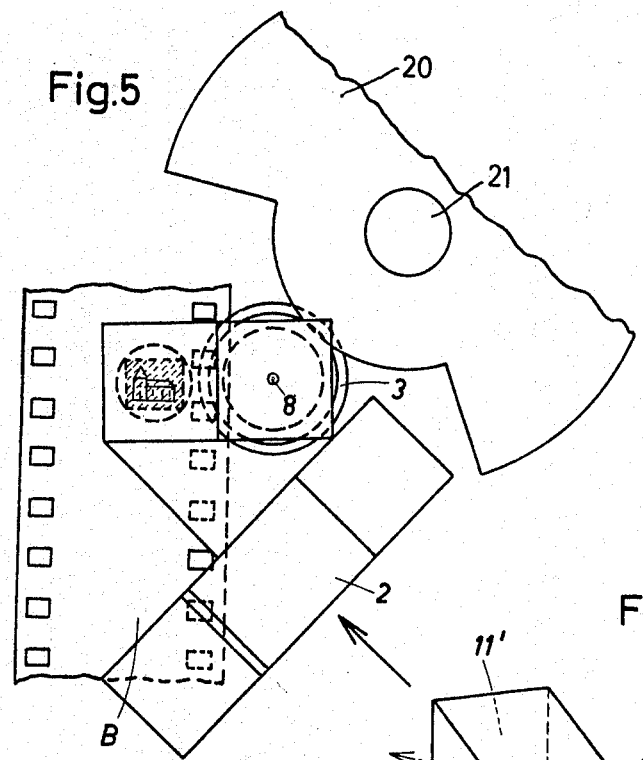
FIG. 5 illustrates the same prism arrangement as FIG. 3, except that the prism arrangement has been displaced in the direction of the arrow shown in FIG. 3 so that another prism of the prism arrangement is moved in operative position.

In FIG. 3 is illustrated a modified Porro's prism system 5 of the second class which together with a likewise modified rhombic prism 2 is displaceable in the direction of the arrow C in such a manner that in the position shown in FIG. 5 the beam of light passing through the camera objective 3 is directed by the Porro's prism system 5 to the side of the film 4 where the picture row B is produced. The pictures in the row B, however, are turned about an angle of 180° with respect to the pictures in the row A.

The rotatable shutter blade is indicated with 20 and the rotatable shutter shaft of the motion picture camera is indicated with 21 in the FIGS. 3, 4, 5, 8, 9 and 10.

The beam of light passing through the camera objective also be deflected by pivoting of the two prism members 2 and 5 about an axis which is parallel to the optical axis of the camera objective. Important is only that the two prism members 2 and 5 are alternatingly brought into operative position.

The rhombic prism 2 is modified inasmuch as its shape is not an exact rhombus (see FIG. 4). It is essential, however, that the entrance face 6 and the exit face 7 are parallel to one another and perpendicular to the optical axis 8 of the camera objective 3, and that furthermore the reflecting faces 9 and 10 are parallel to one another.

Figure 6:
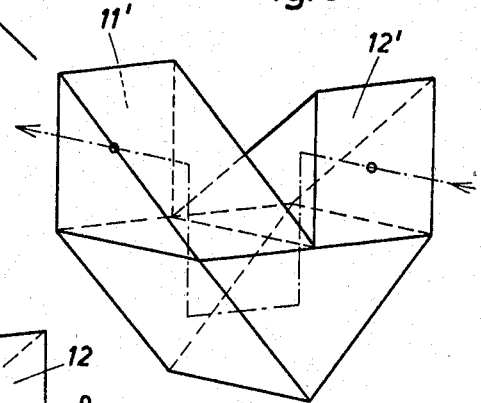
FIG. 6 is a perspective view of a Porro prism reversing system of the second class of conventional form.
Figure 7:
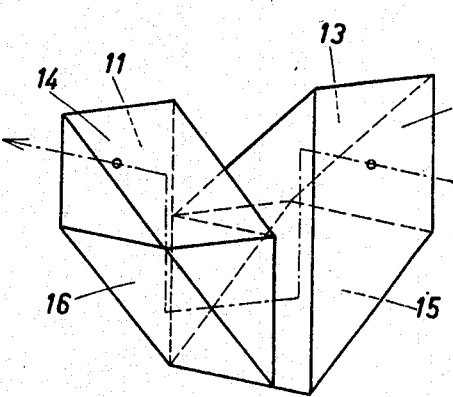
FIG. 7 is a perspective view of a Porro prism system second class of a modified form.

The Porro system 5 of the second class as diagrammatically illustrated in FIGS. 3 and 5 may be modified over the conventional form of a Porro system of the second class illustrated in FIG. 6 in that the exit face 11 is reduced in size, i.e. is made smaller than the entrance face 12, as is shown in FIG. 7. Furthermore, in the modified form of the Porro system the entrance face 12 and the exit face 11 are parallel to one another and are vertically oriented to the optical axis 8 of the camera objective 3. The first reflecting face 13 is perpendicular to the last reflecting face 14, and the second reflecting face 15 is perpendicular to the third reflecting face 16. The modification of the Porro system according to FIG. 7 is recommended for the purpose of shortening the length of the path of the light beam through glass.

Figure 8:
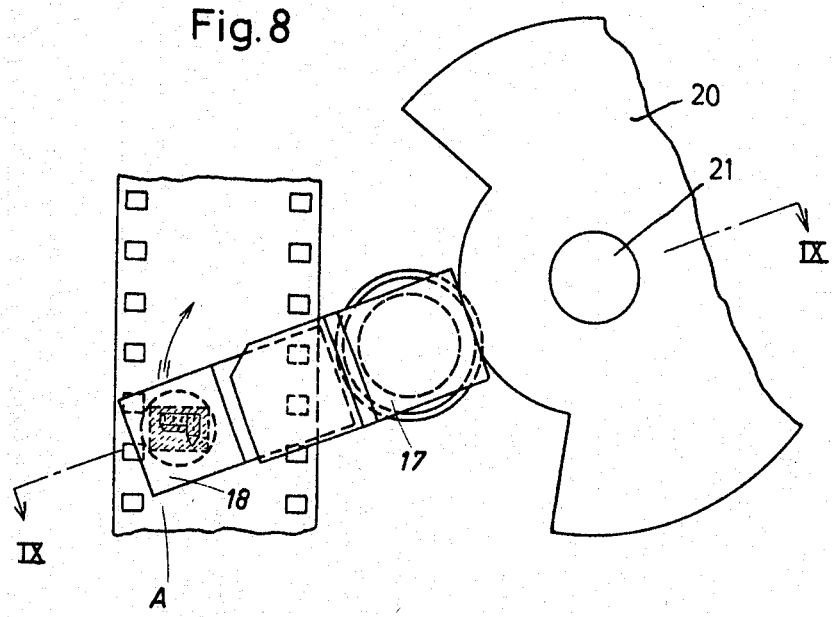
FIG. 8 illustrates a further prism arrangement comprising two rear vision angular prisms in a position to produce the picture row A.

FIG. 8 shows another embodiment of a prism arrangement according to the invention, which comprises two rear vision prisms 17 and 18, each of which corresponds to a 90° reflecting square. The prism 17 is stationary mounted in such a manner that its hypotenuse face is perpendicular to the optical axis of the camera objective 3, and that the beam of light passing along the optical axis is deflected on the two perpendicular faces at angles which are each 90°. The prism 18 is so arranged that the aforementioned beam of light, which has been deflected twice about an angle of 90° and is now displaced parallel to the optical axis of the camera objective, is directed in opposite direction. This beam of light is now deflected by the prism 18 again about an angle of 90° on each of the two perpendicular faces so that after the last deflection the beam of light is back in the same direction as it was when it passed through the camera objective.

Figure 9:
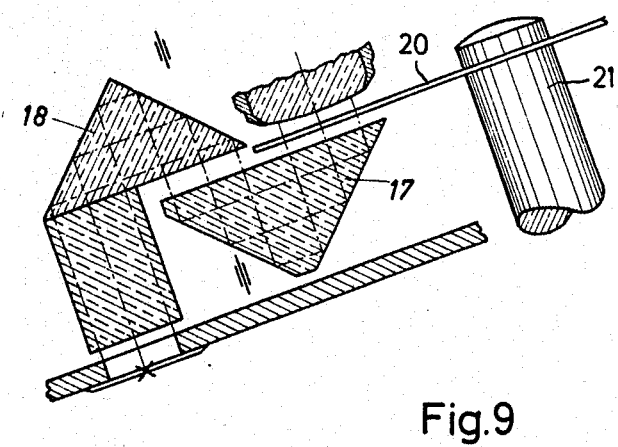
FIG. 9 is a sectional view along the line IX—IX of FIG. 8.
Figure 10:
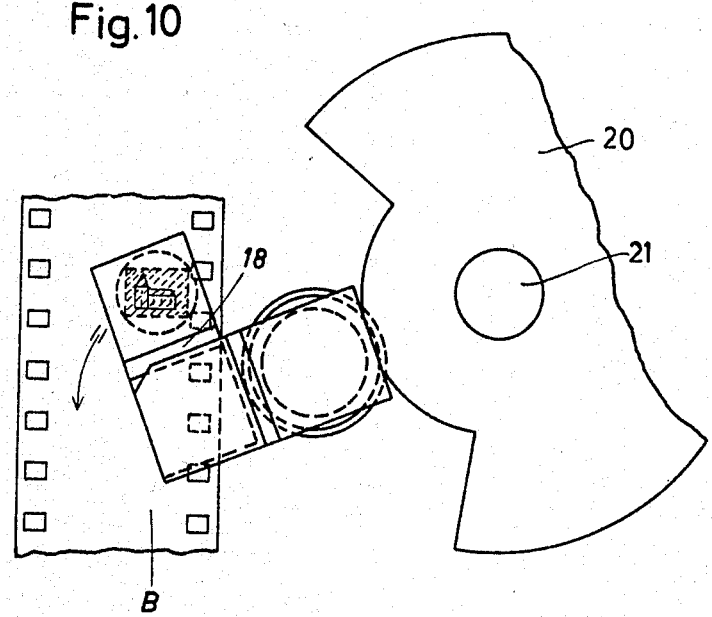
FIG. 10 illustrates the same prism arrangement as FIG. 8, except that one prism has been displaced so that the picture row B is produced.

FIG. 10 shows the same prisms as illustrated in the FIGS. 8 and 9, except that the prism 18 is rotated about an angle of 90° about the mentioned beam of light which is parallel displaced and directed in the opposite direction.

In the position of FIG. 8 the beam of light in this prism arrangement is diverted to the side of the film where the picture row A is produced. In the position of FIG. 10 the beam of light is diverted to produce on the film the picture row B. In the position of FIG. 8 the pictures in the row A are in conventional orientation, and in the position according to FIG. 10 the pictures in the row B are turned about an angle of 180°.

For the solution of the initially stated problem there are still other prism arrangements available, but the two systems described in the foregoing are particularly simple. If the pictures are to appear side true, at least two prism members are necessary, whereby either these two members are displaced perpendicularly with respect to the optical axis, or at least one of these prism members is pivoted about an axis which is parallel to the optical axis of the camera objective.

Figure 11:
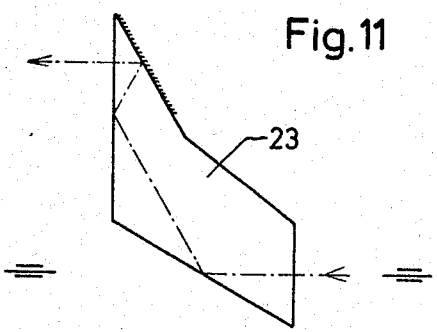
FIG. 11 illustrates another prism of conventional form which may be used in accordance with the invention.
Figure 12:
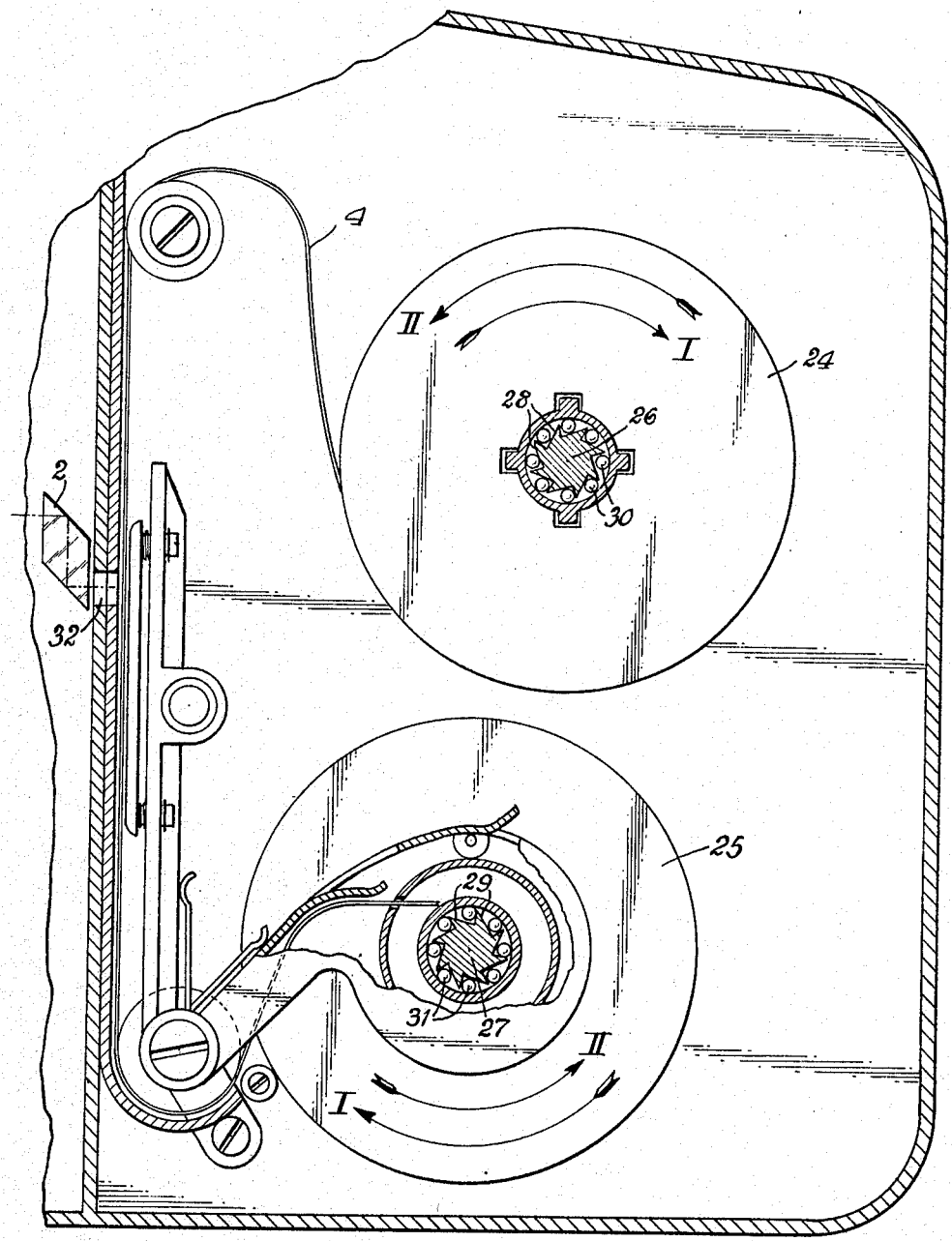
FIG. 12 is an enlargement of a portion of FIG. 1 to show certain details of the spool drive mechanism.

If one is satisfied that the picture sides appear side reversed on the film, one may find relatively simple prism arrangements for this purpose. Even a single prism member will suffice which when it is rotated about the optical axis of the camera objective turns the picture and also displaces it laterally, whereby a rotation of the prism about an angle of 90° results in a 180° rotation of the picture. FIG. 11 illustrates such a prism 23 which would fulfill this purpose.

Such an arrangement, however, has the disadvantage that when projecting the film, the sides have to be rectified again by means of an additional prism, and the arrangement has the further disadvantage that such a side reversed film cannot be combined with a conventional one, i.e. a side true film, so as to form a continuous film. For this reason a prism arrangement which produces side reversed pictures is not described in detail here but is only mentioned for the sake of interest. The exemplary motion picture camera according to FIG. 2 is operated as follows:

The camera has two film spools 24 and 25. A motor (not shown) is acting with the interposition of a gear wheel arrangement (not shown) on either of the spol spindles 26 and 27 of which for shooting images onto the one row of the film during the first shooting period the film spool 24 serves as the feed spool and the film spool 25 serves as the take-up-spool, thereby the motor is acting upon spindle 27 in the direction of the arrow I. Both spools are coupled to their respective spindles by the interposition of nose clutches 28 and 29 in the form of a free-wheeling arrangement which allows to drive the spools in the one direction thus winding up the film exposed on one row and to run empty in the other direction. For this purpose the spindles bear toothed driving rings 28 and 29 resp. and a plurality of balls 30 and 31 resp. which are pressed against the inner wall of the respective ring when the respective spindle is turned in one direction thus coupling the spool with the respective spindle and are released when the spindle is turned in the other direction. The motor for instance for picture taking purposes in the first shooting period acts upon spindle 27 and the film is drawn from spool 24 across the film gate 32 and is wound up onto spool 25. During the second shooting period the direction of rotation of the motor is reversed, and at the same time the prism arrangement 3 is shifted in perpendicular direction to the film plane (direction C of FIG. 3), so that the spool 24 now acts as a take-up-spool by being turned in the direction of arrow II, and spool 25 now acts as a feed spool. It is clear that both the free-wheeling arrangements on spindles 26 and 27 are working in counter-acting directions.

What we claim is:

1. A motion picture camera employing a film of double picture width and provided on both edges with perforations and provided with a camera objective and a film picture plane arranged perpendicularly to the optical axis of said camera objective, including means for exposing on said film two adjacent rows of pictures, firstly one of said rows and then the other one of said rows without exchanging the spools on which said film is unwound and rewound, respectively, between said two picture row exposures, said means comprising a prism system arranged between said camera objective and said film picture plane, and means for adjusting at least one of the prisms of said prism system alternately to two positions in a plane parallel with said film picture plane, in one of which the light rays passing through said camera objective are deflected to produce on said film said one row of pictures, while in the other one of said two positions the light rays passing through said camera objective produce on said film the other one of said rows of pictures.

2. A motion picture camera employing a film of double picture width and provided on both edges with perforations and provided with a camera objective and a film picture plane arranged perpendicularly to the optical axis of said camera objective, including means for exposing on said film two adjacent rows of pictures, firstly one of said rows and then the other one of said rows without exchanging the spools on which said film is unwound and rewound, respectively, between said two picture row exposures, said means comprising a prism system arranged between said camera objective and said film picture plane, and means for adjusting said prism system alternately to two positions in a plane parallel with said film picture plane, in one of which the light rays passing through said camera objective are deflected to produce on said film said one row of pictures, while in the other one of said two positions the light rays passing through said camera objective produce on said film the other one of said rows of pictures, said prism system comprising prisms which are provided with image reflecting surfaces arranged in such a manner that the pictures in said other row of pictures are rotatably displaced about an angle of 180° relative to the pictures in said first mentioned row of pictures and with respect to an axis extending parallel to the optical axis of said camera objective.

3. A motion picture camera according to claim 2, including in said prism system one rhombic prism for producing the first one of said rows of pictures, and a Porro reversing prism of the second class for producing said other row of pictures on said film, said means for adjusting said prism system being effective to selectively move either one of said two prisms at a time into operative position.

4. A motion picture camera according to claim 2, including in said prism system two rear vision prisms each comprising a 90° reflecting square, said two prisms being arranged so that they are rotatably adjustable with respect to each other about an angle of 90° and about an axis which extends parallel to the optical axis of said camera objective, and that their hypotenuse faces are arranged perpendicular to said optical axis.

5. A motion picture camera employing a film of double picture width and provided on both edges with perforations and provided with a camera objective and a film picture plane arranged perpendicularly to the optical axis of said camera objective, including means for exposing on said film two adjacent rows of pictures, firstly one of said rows and then the other one of said rows without exchanging the spools on which said film is unwound and rewound, respectively, between said two picture row exposures, said means comprising a prism system arranged between said camera objective and said film picture plane, and means for adjusting said prism system alternately to two positions in a plane parallel with said film picture plane, in one of which the light rays passing through said camera objective are deflected to produce on said film said one row of pictures, while in the other one of said two positions the light rays passing through said camera objective produce on said film the other one of said rows of pictures, said prism system comprising prisms having image inverting reflecting surfaces which are constructed in such a manner that the pictures in said other row of pictures are rotatably displaced about an angle of 180° relative to the pictures in said first mentioned row of pictures and with respect to an axis extending parallel to the optical axis of said camera objective, the orientation of the pictures in one of said two rows of pictures is the same as it would be without said prism system.

References Cited by the Examiner

UNITED STATES PATENTS

| | | | |
|---|---|---|---|
| 1,846,004 | 2/1932 | Green | 242—55.11 X |
| 1,861,584 | 6/1932 | Ruedeker et al. | 242—55.11 X |
| 2,441,013 | 5/1948 | Ehreshaft | 352—119 |

FOREIGN PATENTS

| | | |
|---|---|---|
| 1,339,648 | 9/1963 | France. |
| 937,029 | 12/1955 | Germany. |

OTHER REFERENCES

Introduction to Geometrical and Physical Optics, McGraw-Hill, New York, 1953, page 19.

NORTON ANSHER, *Primary Examiner.*

VANCE A. SMITH, *Assistant Examiner.*